2,715,618

RUBBER TREATMENT

Kenneth W. Doak, Bloomfield, N. J., assignor to United States Rubber Company, New York, N. Y., a corporation of New Jersey No Drawing. Application December 16, 1953, Serial No. 398,620

4 Claims. (Cl. 260—41.5)

This invention relates to improvements in the technique of processing high carbon black-rubber mixes prior to vulcanization thereof, and more particularly to improvements in so-called "low-hysteresis" processing of mixtures of carbon black and rubber.

The technique of processing high carbon black and rubber mixes prior to vulcanization thereof, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to provide a new chemical promoter for the processing of rubber and carbon black mixes as described in U. S. P. 2,118,601 whereby to obtain high electrical resistance and low torsional hysteresis of tread stocks. A further object is to provide substantial decreases in the time of the low hysteresis processing by the use of the herein disclosed chemical with consequent increase in the capacity and output of equipment. Other objects will appear more fully hereinafter.

I have found that lithium nitrate substantially decreases the time and/or reduces the temperature necessary for low-hysteresis processing. Lithium nitrate is unexpectedly much more effective as a promoter than sodium nitrate. In contrast to lithium nitrate, lithium acetate is completely ineffective. Thus it appears that the action of lithium nitrate is specific.

Lithium nitrate is an effective promoter in natural rubber (e. g., Hevea rubber), in synthetic rubbery homopolymers of aliphatic conjugated diolefin hydrocarbons, especially butadiene and isoprene, and in synthetic rubbery copolymers of such diolefin hydrocarbons with copolymerizable monolefinic compounds, such as isobutylene, styrene, alpha-methyl styrene, methyl acrylate, ethyl acrylate, methyl methacrylate, acrylonitrile, methyl vinyl ketone, and methyl isopropenyl ketone. It is particularly effective in natural rubber, in copolymers of a major proportion, typically from 90 to 99.5%, of isobutylene and a minor proportion, typically correspondingly from 10 to 0.5%, of an aliphatic conjugated diolefin hydrocarbon, especially butadiene or isoprene (known commercially as "Butyl rubber"), and in copolymers of butadiene and styrene (known as "GR–S").

The process of my invention comprises mixing natural rubber or a synthetic rubbery polymer of an aliphatic conjugated diolefin, i. e., an aliphatic conjugated diolefin homopolymer or copolymer, with a relatively large amount of a rubber-reinforcing carbon black, and a relatively small but effective amount of lithium nitrate, typically from 0.75 to 3 parts, calculated as anhydrous salt, per 100 parts of rubbery material, and heating this mixture at a temperature of from 275° F. to a temperature just short of that at which the rubber would be injured, to bring about the desired changes in the rubber-carbon black mixture whereby a vulcanizate of this mixture will have a considerably reduced torsional hysteresis and a considerably increased electrical resistivity. This heat treatment is carried out in the absence of vulcanizing agents, e. g., sulfur or sulfur-yielding compounds. Following the heat treatment, but the vulcanizing and other desired compounding ingredients including conventional accelerators and the like are intimately incorporated in the conventional manner, after which the mixture is shaped and vulcanized in the usual way.

Although the proportion of lithium nitrate referred to herein is in terms of anhydrous lithium nitrate, I prefer to use the lithium nitrate in the form of the commercially available trihydrate, which contains approximately 56% of lithium nitrate.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and lithium nitrate is carried out by mastication at temperatures in the range of 275–400° F., and more preferably in the range of 300–400° F., with any suitable type of masticating equipment such as an open two-roll rubber mill or more preferably an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i. e., whether it is static or dynamic, type of equipment used, e. g., in the case of masticatory heat treatment whether an open rubber mill or a Banbury or other type of internal mixer is used, amount of lithium nitrate used, etc. In any event, the treating time will be considerably shorter, at given temperature conditions, than the time required when the lithium nitrate is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair properties of the final vulcanizate.

When my invention is applied to "Butyl rubber," the heat treatment is usually performed at a higher temperature and for a longer time than is the case with natural rubber or "GR–S," in order to bring about the same reduction in torsional hysteresis and increase in electrical resistivity. With Butyl rubber a temperature of at least 325° F. is preferred, mastication at 325–400° F. being especially preferred.

It is preferable to form an intimate mixture of the rubber, carbon black and lithium nitrate at a relatively low temperature, i. e., below 275° F., in order to avoid premature reaction of the lithium nitrate whereby its promoting effect upon the low-hysteresis processing would be seriously reduced. In many cases I prefer to dissolve the lithium nitrate in a minimum quantity of water to form a solution which can conveniently be added to the rubber and black mixture on the rubber mill or in the Banbury mixer.

The following examples illustrate the preferred methods of practicing the invention. All parts are by weight.

*Example 1*

A masterbatch is prepared by mixing together 100 parts of natural rubber, 50 parts of carbon black (a medium processing channel black known commercially as Spheron–6) and 5 parts of stearic acid. This mixing operation is carried out in the conventional manner in a Banbury mixer or on a two-roll rubber mill. To 155 parts of this masterbatch 2.5 parts of lithium nitrate hydrate ($LiNO_3 \cdot 3H_2O$, dissolved in a minimum amount of water) is added on a two-roll rubber mill at a batch temperature of about 200° F. The mill temperature is then raised to 300° F. and the mixture is masticated for 10 minutes. Thereafter the mill is cooled to 150–200° F. and 2 parts of pine tar, 2 parts of zinc oxide, one part of antioxidant, 1 part of accelerator and 2.6 parts of sulfur are incorporated. The mixture is placed in a suitable mold and vulcanized for 45 minutes at 287° F. As a control an identical masterbatch is prepared and subjected to all the previously described manipulative steps except that no lithium nitrate is added to the mixture. A third experiment is carried out in an identical manner except that 2.0 parts of lithium acetate dihydrate are added to the rubber and carbon black mixture. The specific electrical resistivity and torsional hysteresis are measured, with the following results:

| Promoter | Log Resistivity | Tors. Hyst., 280° F. |
| --- | --- | --- |
| None | 7.2 | 0.127 |
| Lithium nitrate | >13.0 | 0.071 |
| Lithium acetate | 7.5 | 0.207 |

The practice of the invention has increased the specific electrical resistivity by a factor of over 300,000, and has reduced the torsional hysteresis by 44%. Lithium acetate, on the other hand, is completely ineffective.

*Example 2*

A masterbatch is prepared by mixing in a conventional manner 100 parts of an isobutylene-isoprene copolymer (known commercially as Butyl–15) and 50 parts of channel black ("Spheron #6"). Then 1.5 parts of lithium nitrate trihydrate dissolved in a small amount of water is added at a temperature below 275° F. The mixture is then masticated for 15 minutes at 375° F. Thereafter, 5 parts of zinc oxide, 3 parts of stearic acid, 1 part of tetramethylthiuram disulfide, 0.5 part of 2-mercaptobenzothiazole, and 2 parts of sulfur (per 100 parts of rubber) are incorporated at 150–225° F. The stock is vulcanized 45 minutes at 293° F. A control stock is subjected to the same manipulative steps, except that no lithium nitrate is used.

| Promoter | Log Resistivity | Tors. Hyst., 280° F. |
| --- | --- | --- |
| None | 6.9 | 0.156 |
| Lithium nitrate | 9.2 | 0.101 |

The practice of the invention has increased the specific electrical resistivity by a factor of about 375, and has reduced the torsional hysteresis by 35%.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and lithium nitrate in any suitable manner and then heat this mixture at 275–400° F. without simultaneously masticating it, the heat-treated mixture being subsequently masticated and compounded with conventional compounding and vulcanizing ingredients followed by shaping and vulcanizing in the usual way. The static heat treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of succcessive oscillations of a torsion pendulum, measured at 280° F. with an apparatus consisting essentially of a torsion pendulum in which the sample of rubber tested supplies the restoring force when the pendulum is deflected. For further description of this test see Gerke et al. 2,118,601.

Having thus described my invention, what I claim and desire to protect by Letters Patent is:

1. A process which comprises mixing rubber with a relatively large amount of rubber-reinforcing carbon black and from 0.75 to 3 parts of lithium nitrate, calculated as anhydrous salt, per 100 parts of said rubber heating the mixture at a temperature of at least 275° F. but below that at which the rubber would be harmed, thereafter incorporating vulcanizing and other desired ingredients, shaping the mass, and vulcanizing the resulting shaped mass.

2. A process which comprises mixing rubber with a relatively large amount of rubber-reinforcing carbon black, and from 0.75 to 3 parts of lithium nitrate, calculated as anhydrous salt, per 100 parts of said rubber, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black, and from 0.75 to 3 parts of lithium nitrate, calculated as anhydrous salt, per 100 parts of said rubber, masticating the mixture at a temperature of from 275 to 400° F., thereafter incorporating vulcanizing and other desired ingredients, shaping the mass, and vulcanizing the resulting shaped mass.

4. A process which comprises mixing a rubbery copolymer of isobutylene and an aliphatic conjugated diolefin with a relatively large amount of a rubber-reinforcing carbon black, and from 0.75 to 3 parts of lithium nitrate, calculated as anhydrous salt, per 100 parts of said copolymer, masticating the mixture at a temperature of from 325° F. to 400° F., thereafter incorporating vulcanizing and other desired ingredients, shaping the mass, and vulcanizing the resulting shaped mass.

References Cited in the file of this patent

UNITED STATES PATENTS 2,118,601    Gerke et al. _____ May 24, 1938